Nov. 10, 1959
J. W. HUDSON
2,912,197
UNDERFLOOR DUCT SUPPORT
Filed Oct. 31, 1955
2 Sheets-Sheet 1
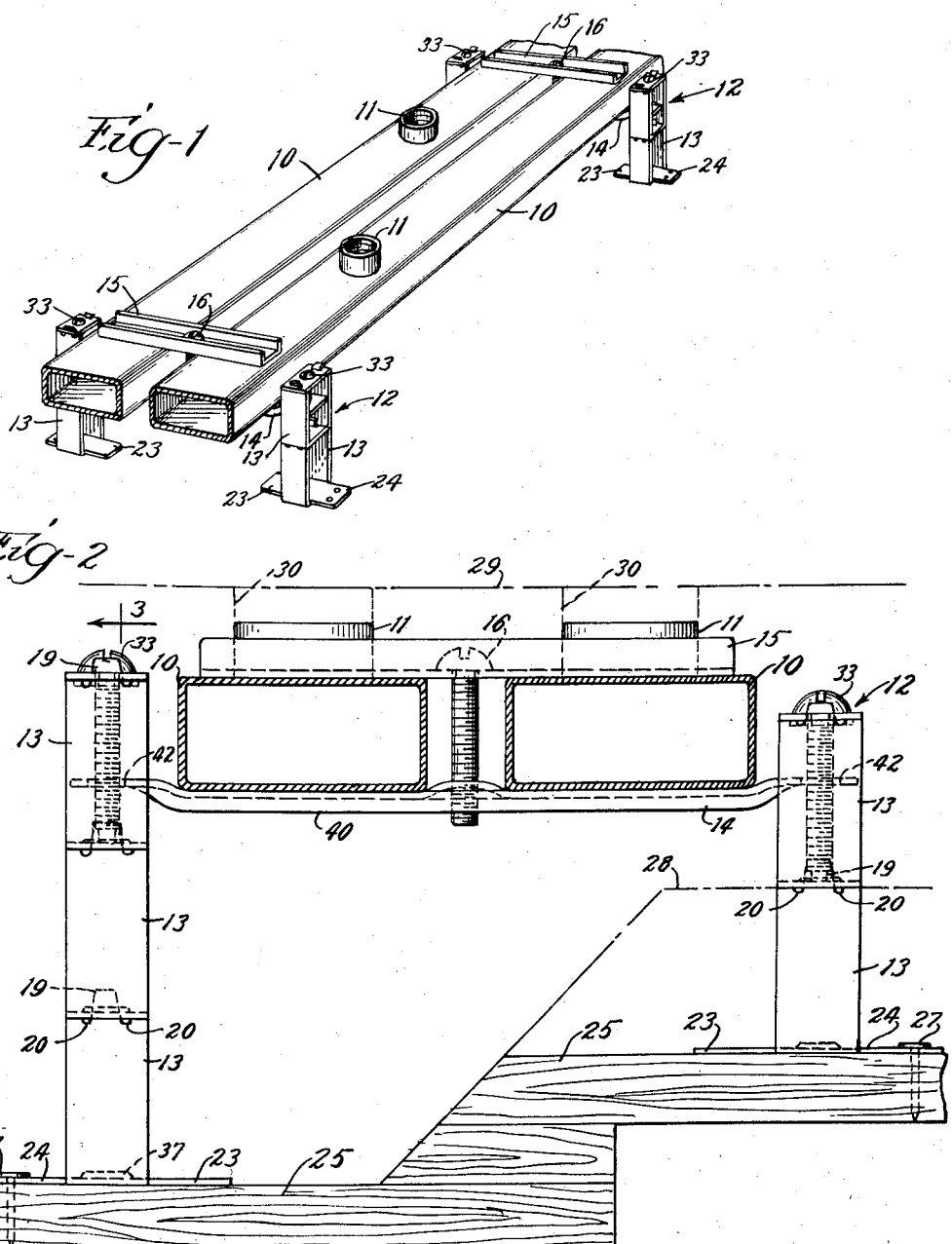
INVENTOR.
James W. Hudson
BY
Cromwell, Greist & Warden

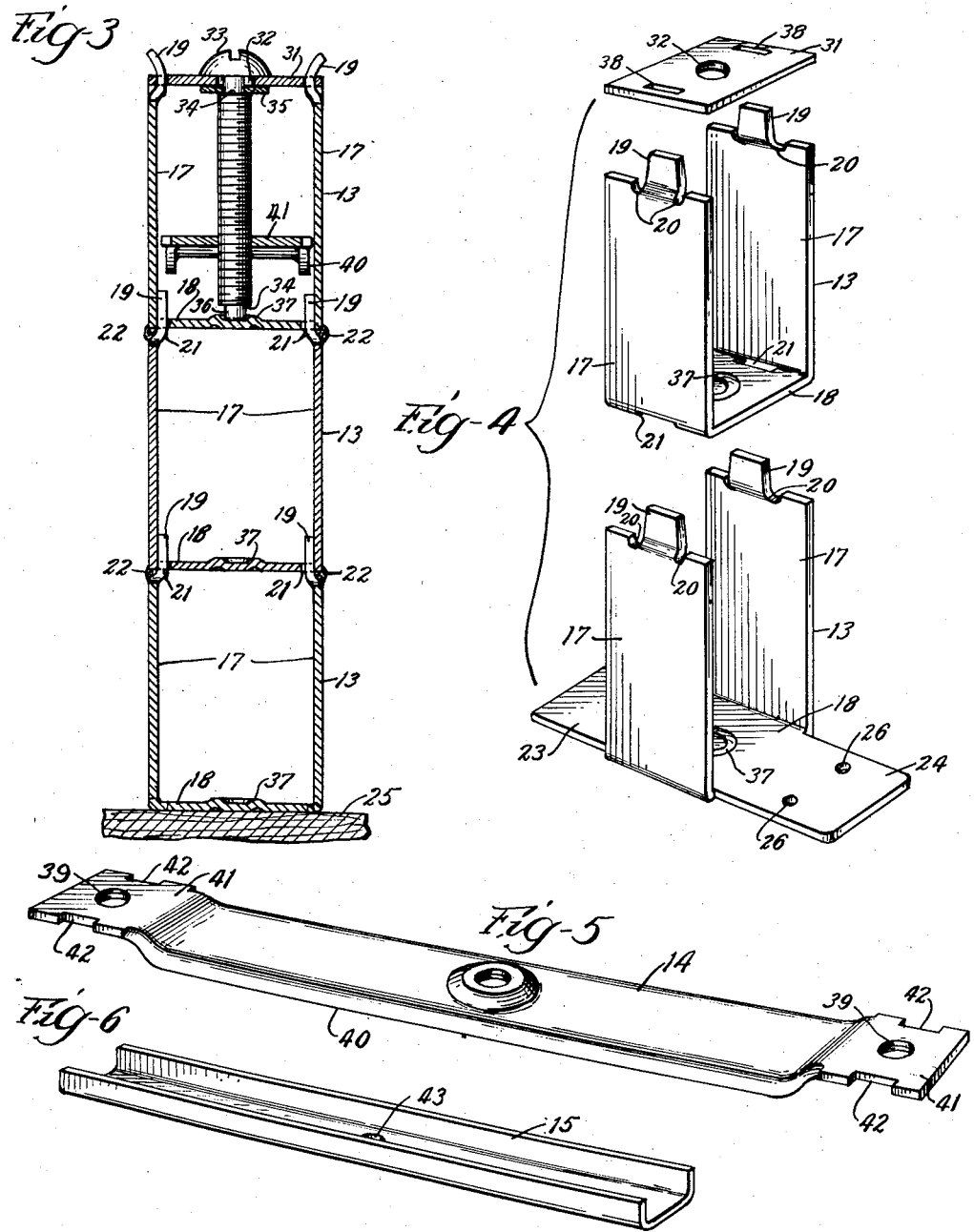

United States Patent Office 2,912,197
Patented Nov. 10, 1959

2,912,197

UNDERFLOOR DUCT SUPPORT

James W. Hudson, Elmhurst, Ill., assignor, by mesne assignments, to The National Supply Company, a corporation of Ohio Application October 31, 1955, Serial No. 543,885

8 Claims. (Cl. 248—49)

The present invention relates generally to a new and improved supporting device adapted for use with wire-carrying ducts forming a part of an underfloor wire distribution system to position the same prior to the burying thereof in sub-flooring material. More specifically, the present invention is directed to a new and improved duct support which is formed from elements which are adapted to be used in varying numbers to thereby coarsely control the height of the duct support, and which support is further provided with adjustable means whereby the total operative height of the duct support is susceptible to fine adjustment.

Underfloor wire distribution systems are in common use in relatively large building structures where it is desired to distribute various wiring systems such as electrical power systems, telephone systems and signal systems throughout a room of substantial area which is not subdivided by walls of the type adapted for carrying internally therein the aforementioned types of wiring systems. Under such circumstances, the wires are normally carried by ducts extending from junction boxes or the like which form an underfloor wire distribution system buried in the subflooring of the building. The ducts are provided with upwardly directed outlets which may be tapped and used with suitable electrical fittings attached to the upper surface of the floor covering to provide means for obtaining access to the various wiring systems carried by the underfloor distribution system. In this manner spaced outlets may be obtained in rooms of large unrestricted areas without the necessity of subdividing the total area by otherwise unnecessary relatively costly vertical wall construction.

In burying the underfloor wire distribution system in the sub-flooring of a building, the procedure normally followed is that of first setting up the underfloor system by connecting the required number of ducts and junction boxes and mounting the same on the structure base of the sub-flooring. In bringing this about it is necessary to level the wire distribution system as much as possible throughout the entire area covered by the system so that the system will ultimately be substantially parallel to the top surface of the floor upon the completion thereof. The wire-carrying ducts are generally of shorter vertical height than the junction boxes to which they are connected and, in the instance where the ducts are of substantial length, it is necessary to support these ducts at spaced intervals throughout the distances covered by the ducts from one junction box to another. To bring this about various forms of duct supports have been devised which are provided with laterally spaced, vertical legs, the bottom surfaces of which rest on the structural base of the sub-flooring and the upper portions of the vertical legs having a duct supporting member extending therebetween to vertically position the ducts in proper alignment with the spaced junction boxes as well as within close proximity to the predetermined upper surface of the sub-flooring so that the spaced fitting openings extending along the ducts may be made readily accessible from the top of the finished floor.

Due to the variations in sub-flooring thickness as well as the variations in the level or the flatness of the structural base for the sub-flooring, it has been found necessary to bring about considerable adjustment with respect to the vertical height of the cross members of the duct supports on which the ducts rest. Such adjustment must be made during the installation of the underfloor wire distribution system prior to the pouring of the sub-flooring as the unevenness of the structural base for the sub-flooring as well as the variations in thickness of the sub-flooring may not be readily predetermined. By necessity, therefore, the duct supports must be adapted for adjustment to an extent that the bridging member which carries the ducts can be located in a vertical plane which will vary sometimes considerably throughout the entire floor area. Upon proper adjustment being made and the wire-carrying ducts and junction boxes installed in their operative position on the structural base of the sub-flooring, concrete is then flowed about the wire distribution system to form the sub-flooring and the system, as a result, is permanently buried therein. The top floor covering is then laid and any number of electrical fittings are mounted on the top flooring and connected to the wire-carrying ducts for varied uses. In following such a procedure the duct supports must not only be capable of vertical adjustment in order to fit varying needs but must furthermore be sturdily constructed so as to be capable of retaining the desired positioning of the wire-carrying ducts during the forming of the sub-flooring.

It is an object of the present invention to provide a new and improved wire-carrying duct support which is adapted for substantial vertical adjustment on the job without the necessity of the use of skilled labor or special tools.

Another object is to provide a new and improved duct support, the vertical height of which may be coarsely as well as finely adjusted, so that on the job precise vertical positioning of the wire-carrying ducts may be accomplished.

A further object is to provide a duct support of sturdy construction which is capable of retaining its duct-supporting position during the formation of the sub-flooring and which is provided with a specially designed base which provides the support with a solid footing during the adjustment of the height of the wire-carrying ducts through the entire lengths thereof without the necessity of permanently fixing the duct support to the structural base for the sub-flooring until the final adjustment of the overall height of the entire underfloor wire distribution system is accomplished.

Other objects not specifically set forth will become apparent from the following detailed description of the present invention made in connection with the drawings wherein:

Fig. 1 is a perspective fragmentary view of a section of a twin duct system illustrating the use of the duct support of the present invention at spaced intervals therealong;

Fig. 2 is a vertical fragmentary section of a finished floor illustrating the manner in which twin wire ducts are positioned within the sub-flooring in combination with the duct support of the present invention, the illustration of Fig. 2 being of a composite nature further illustrating on a comparative basis the coarse vertical height adjustment feature of the duct support;

Fig. 3 is a vertical section of one of the legs of the duct support taken along line 3—3 of Fig. 2;

Fig. 4 is an exploded perspective view of the segmental elements making up the legs of the duct support;

Fig. 5 is a perspective view of the bridging member of the duct support; and

Fig. 6 is a perspective view of the clamping member of the duct support.

Referring in particular to Fig. 1, a twin duct system is shown as including two separate wire-carrying ducts 10 which are provided with openings along the top surfaces thereof defined by vertical circular flanges 11. The ducts 10 may extend for any desired distance and, of course, may be provided with any number of longitudinally spaced flanged openings 11. At spaced intervals along the ducts 10 are duct supports generally designated by the reference numeral 12. The duct supports 12 are designed to clampingly receive the ducts 10 and thereby laterally position the ducts at spaced intervals with respect to one another as well as control the height thereof with respect to the structural base of the sub-flooring of a building.

Figs. 1 and 2 generally illustrate the structure of the improved duct supports of the present invention and, with respect to these views, the duct support 12 is illustrated as being provided with laterally spaced vertically extending legs which are formed from at least one leg segment 13. The uppermost segment 13 of each of the legs has inserted therein an end of a bridging member 14 which forms a part of a clamping means further including a top clamping member 15 receiving therethrough a threaded bolt 16 which is threadedly received through the bridging member 14 centrally thereof.

Referring in particular to Figs. 3 and 4, the vertical legs of the duct support 12 are each formed from a number of interfitting detachable leg segments 13 which are generally U-shaped. The segments 13 are formed from vertically directed, laterally spaced side walls 17 which are integrally connected at the bottoms thereof with a bottom wall 18. The top surfaces of the side walls 17 are provided with upwardly directed wedge-shaped tongues 19 which are positioned slightly inwardly of the side walls 17 at the base portions thereof as defined by the laterally spaced indented portions 20.

Each of the bottom walls 18 of the leg segments 13 are provided with laterally spaced slots 21 which are positioned just inwardly of the side margins thereof and which are adapted to receive the upwardly projecting tongues of another segment 13 positioned directly therebelow. Due to the wedge shape of the tongues 19, they may be forceably received by the slots 21 of an adjacent segment and frictionally retained thereby to form a vertical leg composed of a plurality of segmental sections 13. The manner of interconnecting the segments 13 is clearly shown in Figs. 2 and 3 wherein a leg is shown as being formed from the interconnection of three segmental sections 13.

It should be understood that while the tongues 19 have been described as being wedge-shaped, any suitable method of retainingly interconnecting the segments 13 to form a leg of suitable height may be relied upon. For example, the tongues 19 may be designed so as to be loosely received by the slots 21, and in order for the segments to be retainingly engaged under these circumstances, the tongues 19 may be bent inwardly toward the central portion of the bottom wall 18 with which they are associated following their insertion within the slots 21 of that wall. Still further, spot welding may be relied upon to interconnect adjacent segments and such welding may be carried out at any desirable location such as indicated by the spot welds 22 in Fig. 3.

The bottom segment 13 of each of the legs is preferably provided with a bottom wall 18 having laterally extending projections 23 and 24 extending integrally from each of the opened ends thereof. As illustrated in Fig. 2, the projections 23 and 24 are adapted to abut the top surface of a structural base 25 to provide lateral support to each of the legs of the duct support 12 and thereby prevent collapsing of the support during the height adjustment thereof and prior to the permanent fastening of the legs of the duct support 12 to the structural base 25 of the sub-flooring. The outwardly directed projections 24 are each provided with drilled holes 26 to receive suitable fastening means such as the nail 27 illustrated in Fig. 2.

As previously described, the fastening means are inserted following complete adjustment of the entire underfloor wiring distribution system with respect to its overall variable vertical height. Due to the presence of the laterally extending projections 23 and 24 which provide the duct support with both inwardly and outwardly directed supporting means, it is unnecessary to permanently fasten the duct support to the structural base 25 by means of the nails 27 until total over-all adjustment of the entire system is obtained. Furthermore, due to the presence of this type of lateral support, it is possible to make considerable varying height adjustment to a series of duct supports without the danger of the supports tipping over or otherwise being moved out of line. Still further, during the total over-all height adjustment of the underfloor wire distribution system, it is often the case that the ducts carried by the duct supports are accidentally knocked by the workers making the adjustment. Due to the extensive lateral support supplied by the projections 23 and 24, the duct supports 12 are able to withstand considerable abuse without tipping over or being knocked out of line with respect to the ducts carried thereby. Obviously any suitable means may be used in attaching the projection 24 to the structural base 25. As illustrated in Fig. 2, the structural base 25 is wooden and, under such circumstances, fastening means such as nails 27 are entirely adequate. In the event that the structural base 25 is formed from concrete or like material, another type of fastening means may be preferred.

As illustrated in Fig. 2, any number of leg segments 13 may be used to bring about the desired coarse adjustment of the height of the duct support 12. In the case of the left hand leg of the duct support 12 of Fig. 2, three leg segments 13 are used to provide the duct support with proper coarse height adjustment. In the right hand side of the view in Fig. 2 the structural base 25 is shown in a raised position and the right hand leg is illustrated as including two leg segments 13. The broken line 28 in the right hand portion of the view of Fig. 2 further illustrates a level of a structural base which would require the use of only a single leg segment 13 to provide the duct support 12 with proper coarse height adjustment. As a result, regardless of the varying degree to which the structural base 25 of a particular building will vary throughout the entire area of the flooring, the duct support 12 of the present invention is readily adapted for considerable variation in the height of its legs by simply adding or removing a requisite number of leg segments 13. This particular feature is of considerable importance as it is extremely desirable to install a wire distribution system which is level with respect to the finished top surface of the floor. The variations in height may be readily made on the job by unskilled labor without the use of special or expensive equipment.

Upon the attainment of the proper leveling of the underfloor wire distribution system, the sub-flooring normally formed from concrete is poured and the system is buried therein. The wire-carrying ducts 10 are preferably raised by the duct supports 12 a distance from a structural base 25 to allow the top edge of the flanged openings 11 to be in close proximity to the top surface of the sub-flooring. Following the pouring of the sub-flooring, the top flooring, such as wood or linoleum, is laid and suitable openings are made therethrough in line with the flanged openings 11 for the mounting of electrical fittings on the top surface of the top flooring aligned with the flanged openings 11 to allow the connection of the fittings to the various parts of the wiring system carried by the ducts 10. As illustrated in Fig. 2, the broken line 29 designates the level of the top flooring and the broken lines 30 illustrate the openings through the top flooring in communication with the flanged openings 11 of the buried wire distribution system.

The top segment 13 of each of the legs is supplied with a top plate 31. This plate is provided centrally thereof with a drilled hole 32 through which passes a threaded bolt 33. The threaded portion of the bolt 33 defines at each end thereof shoulders 34, the top one of which carries a retaining ring 35 which retains the bolt 33 freely rotatable within the drilled hole 32. Outwardly from the bottom shoulder 34 is a projection 36 of reduced diameter which fits into a circular area defined by a circumferentially continuous raised portion 37 in the top surface of the bottom wall 18. Each of the segments 13 are provided with a raised circular portion 37 in the top surface of the bottom wall 18 thereof so that each of the segments 13 may be used to receive the top plate 31 and the bolt 33. The projection 36 of the bolt 33 is centered by the raised portion 37 and the bolt 33 is restricted with respect to lateral movement within the central portion of the segment 13 with which it is associated. The top plate 31 can be retained by any one of the segments 13 by being provided with laterally spaced slots 38 near the side margins thereof which receive therethrough the tongues 19 of a segment 13. As previously described, the tongues 19 received through the slot 38 may be retained therein by reason of being wedge-shaped or, as illustrated in Fig. 3, may be bent outwardly following their insertion through the slots 38 and in that manner retain the top plate 31 in its operative position.

Referring to Figs. 2, 3 and 5, the threaded bolt 33 is threadedly received by the bridging member 14 by reason of a tapped hole 39 being provided in each end portion of the bridging member 14. The bridging member 14 is formed from a central portion provided with downwardly directed axially extending side flanges 40 and having at each of the ends thereof an integrally connected raised portion 41. Each of the raised portions 41 contain the tapped holes 39 to receive the threaded bolts 33 carried by the top segments 13 of each of the laterally spaced legs. The raised portions 41 are further provided with inwardly directed grooves 42 along the side surfaces thereof which are of sufficient depth and width to allow the raised portions 41 to pass downwardly between the side walls 17 of a segment 13 past the tongues 19 received by the bottom wall 18 of the segment. By this arrangement the bridging member 14 may be moved in a vertical direction throughout the entire interior of a segment 13 without its movement being limited by its abutment with the tongues 19. As illustrated particularly in Fig. 3, the bridging member 14 may be adjusted vertically with respect to the top segment 13 on each side thereof by rotating the bolt 33 in such a manner as to either advance or retract the bolt 33 within the tapped hole 39. By this arrangement a fine vertical adjustment of the bridging member 14 is brought about and this vertical adjustment in combination with the coarse vertical adjustment previously described appreciably increases the utility and efficiency of the improved duct support 12 of the present invention.

The clamping member 15, shown in detail in Fig. 6, may take any desirable form as long as it is functionally operable to be drawn toward the bridging member 14 into clamping engagement with the top surfaces of the ducts 10. As illustrated in Fig. 6, the clamping member 15 is a channel member and is provided with a drilled hole 43 therethrough to receive the clamping bolt 16 previously described.

In addition to the various modifications possible in making full efficient use of the duct support 12 of the present invention, it should be pointed out that any number of laterally spaced wire-carrying ducts 10 may be supported by a single duct support 12. As illustrated in the drawings, a twin duct system is shown but it should be understood that duct supports incorporating the principles of the present invention may be manufactured for the purpose of carrying any number of wire-carrying ducts. For example, the bridging member 14 and the clamping member 15 may be designed to carry a single duct 10 or any number of laterally spaced ducts 10. In the event that more than two ducts are carried by a single duct support 12 it is preferable that the bridging member 14 and clamping member 15 of each duct support 12 be supplied with clamping bolts 16 between each of the ducts supported thereby. In this manner suitable clamping action can be obtained and the ducts, regardless of the number, securely retained by the duct support 12.

Obviously many modifications and variations of the invention as hereinbefore set forth may be made without departing from the spirit and scope thereof, and therefore only such limitations should be imposed as are indicated in the appended claims.

I claim:

1. A wire-carrying duct support including segmental laterally spaced legs, a duct clamping assembly bridging said legs, the positional height of said clamping assembly being coarsely adjustable by the number of segments included in forming each leg, and adjustment means carried by the top segment of each of said legs and connected with said clamping assembly to provide fine positional height adjustment thereto, each of said legs being formed from at least one segment which is generally U-shaped and provided with an upwardly directed tongue defining the uppermost extremity thereof and a tongue-receiving slot associated with the bottom surface thereof.

2. A wire-carrying duct support including segmental laterally spaced legs, a duct clamping assembly bridging said legs, the positional height of said clamping assembly being coarsely adjustable by the number of segments included in forming each leg, and adjustment means carried by the top segment of each of said legs and connected with said clamping assembly to provide fine positional height adjustment thereto, each of said legs being formed from at least one segment which is generally U-shaped and provided with at least one upwardly directed tongue defining the uppermost extremity thereof and at least one tongue-receiving slot formed in the bottom surface thereof, said tongues being wedge-shaped to be forceably received and frictionally retained by the slots of an adjacent segment.

3. A wire-carrying duct support including segmental laterally spaced legs, a duct clamping assembly bridging said legs, the positional height of said clamping assembly being coarsely adjustable by the number of segments included in forming each leg, and adjustment means carried by the top segment of each of said legs and connected with said clamping assembly to provide fine positional height adjustment thereto, each of said legs being formed from at least one segment which is generally U-shaped and provided with an upwardly directed tongue defining the uppermost extremity thereof and a tongue-receiving slot formed in the bottom surface thereof, the bottom segment of each leg being provided with laterally extending projections to provide said device with lateral support.

4. A wire-carrying duct support including segmental laterally spaced legs, a duct clamping assembly bridging said legs, the positional height of said clamping assembly being coarsely adjustable by the number of segments included in forming each leg, each of said segments being formed from laterally spaced vertically extending side walls integrally joined at the bottoms thereof by a horizontally extending bottom wall to define a generally U-shaped outline, the top portions of said side walls being provided with upwardly directed tongues, the bottom wall being provided with slots associated with the side margins thereof to reeceive the tongues of a segment positioned immediately therebelow, and adjustment means carried by the top segment of each of said legs and connected with said clamping assembly to provide fine positional height adjustment thereto.

5. A wire-carrying duct support including segmental laterally spaced legs, a duct clamping assembly bridging said legs, the positional height of said clamping assembly being coarsely adjustable by the number of segments included in forming each leg, each of said segments being formed from laterally spaced vertically extending side walls integrally joined at the bottoms thereof by a horizontally extending bottom wall to define a generally U-shaped outline, the top portions of said side walls being provided with upwardly directed tongues, the bottom wall being provided with slots associated with the side margins thereof to receive the tongues of a segment positioned immediately therebelow, and adjustment means carried by the top segment of each of said legs and connected with said clamping assembly to provide fine positional height adjustment thereto, the bottom segment of each of said legs being provided with laterally extending projections at opposite ends thereof to provide said duct support with lateral support, said projections extending in a direction parallel with said clamping assembly, the outermost projection of each leg being provided with fastening receiving means.

6. A supporting device adapted for use with wire-carrying ducts to position the same prior to the burying thereof in sub-flooring material, said device including laterally spaced vertically extending legs having attached thereto a bridging member near the top portions thereof adapted to receive the bottom surfaces of wire-carrying ducts thereupon in resting engagement, and clamping means connected to said bridging member to retain ducts in engagement with said bridging member, said legs being formed from interfitting detachable segments to allow coarse adjustment of the positional height of said bridging member, each of said segments being generally U-shaped and provided with an upwardly directed tongue defining the uppermost extremity thereof and a tongue receiving slot formed in the bottom surface thereof, the top segment of each of said legs having a top plate received and held by the tongue thereof, a bolt received downwardly through said top plate intermediate the side walls of said top segment, said bolt being threadedly received by said bridging member to provide the same with fine positional height adjustment.

7. A supporting device adapted for use with wire-carrying ducts to position the same prior to the burying thereof in sub-flooring material, said device including laterally spaced vertically extending legs having attached thereto a bridging member near the top portions thereof adapted to receive the bottom surfaces of wire-carrying ducts thereupon in resting engagement, and clamping means connected to said bridging member to retain ducts in engagement with said bridging member, said legs being formed from interfitting detachable segments to allow coarse adjustment of the positional height of said bridging member, each of said segments being formed from laterally spaced vertically extending side walls integrally joined at the bottoms thereof by a horizontally extending bottom wall to define a generally U-shaped outline, the top portions of said side walls being provided with upwardly directed tongues, the bottom wall being provided with slots inwardly of the side margins thereof to receive the tongues of a segment positioned immediately therebelow, the top segment of each of said legs having a top plate received and held by the tongues thereof, a bolt received downwardly through said top plate intermediate the side walls of said top segment, said bolt being threadedly received by said bridging member to provide the same with fine positional height adjustment, the bottom segment of each of said legs being provided with laterally extending projections at opposite ends thereof to provide said device with lateral support, said projections extending in a direction parallel with said bridging member, the outermost projection being provided with fastening receiving means.

8. A supporting device adapted for use with wire-carrying ducts to position the same prior to the burying thereof in sub-flooring material, said device including laterally spaced vertically extending legs having attached thereto a bridging member near the top portions thereof adapted to receive the bottom surfaces of wire-carrying ducts thereupon in resting engagement, and clamping means associated with said bridging member to retain ducts in engagement with said bridging member, said clamping means including a vertically extending bolt threadedly received by said bridging member between each of the ducts in resting engagement therewith, said legs being formed from interfitting detachable segments to allow coarse adjustment of the positional height of said bridging member, each of said segments being formed from laterally spaced vertically extending side walls integrally joined at the bottoms thereof by a horizontally extending bottom wall to define a generally U-shaped outline, the top portions of said side walls being provided with upwardly directed tongues, the bottom wall being provided with slots inwardly of the side margins thereof to receive the tongues of a segment positioned immediately therebelow, said tongues being wedge-shaped to be forceably received and frictionally retained by the slots of an adjacent segment, the top segment of each of said legs having a top plate received and held by the tongues thereof, a bolt received downwardly through said top plate intermediate the side walls of said top segment, said bolt being threadedly received by said bridging member to provide the same with fine positional height adjustment, the bottom segment of each of said legs being provided with laterally extending projections at opposite ends thereof to provide said device with lateral support, said projections extending in a direction parallel with said bridging member, the outermost projection being provided with fastening receiving means.

References Cited in the file of this patent

UNITED STATES PATENTS

| | | |
|---|---|---|
| 396,321 | Baird | Jan. 15, 1889 |
| 1,924,305 | Blinn | Aug. 29, 1933 |
| 1,956,879 | Sharp | May 1, 1934 |
| 2,353,443 | Carpenter et al. | July 11, 1944 |
| 2,529,649 | Coplen | Nov. 14, 1950 |
| 2,654,487 | Degener | Oct. 6, 1953 |